J. DIOU.
TRUCK.
APPLICATION FILED JUNE 29, 1915.
1,189,430.
Patented July 4, 1916
2 SHEETS—SHEET 1.
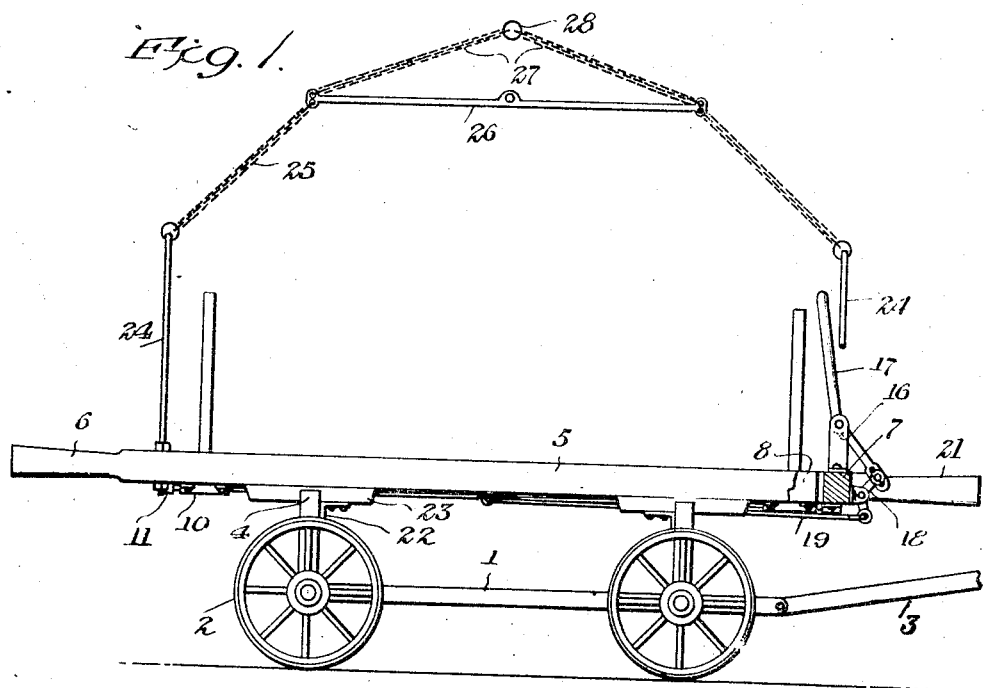
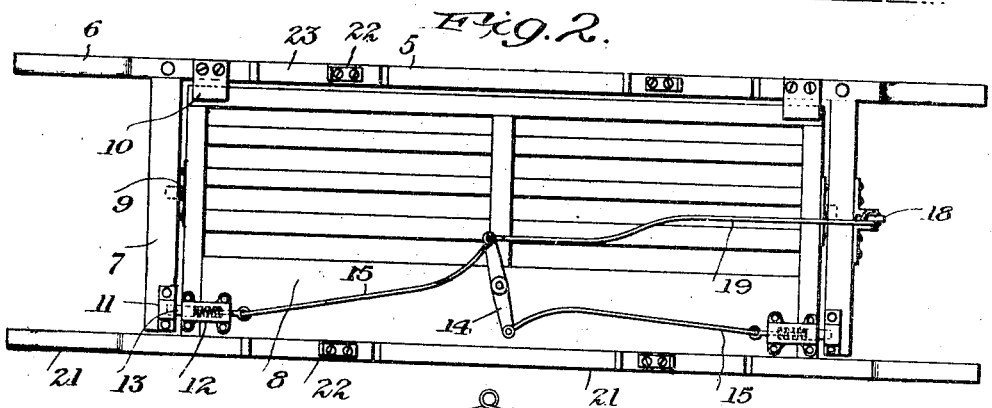
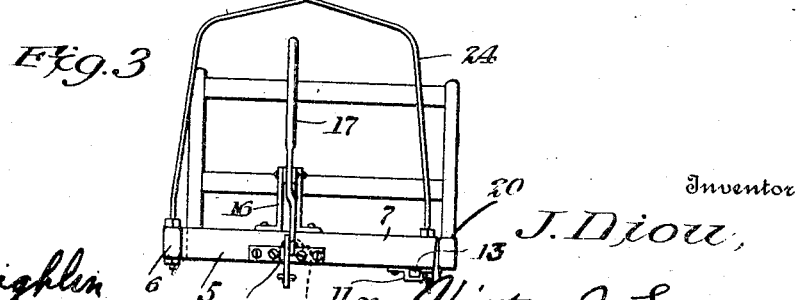
Inventor
J. Diou,
By Victor J. Evans
Attorney
Witness:
M. E. Laughlin

J. DIOU.
TRUCK.
APPLICATION FILED JUNE 29, 1915.

1,189,430.

Patented July 4, 1916.
2 SHEETS—SHEET 2.

Witness
H. E. Laughlin

Inventor
J. Diou
By Victor J. Evans
Attorney

UNITED STATES PATENT OFFICE.

JULIAN DIOU, OF NEWARK, NEW JERSEY.

TRUCK.

1,189,430.

Specification of Letters Patent.

Patented July 4, 1916.

Application filed June 29, 1915. Serial No. 37,019.

*To all whom it may concern:*

Be it known that I, JULIAN DIOU, a subject of the Emperor of Germany, residing at Newark, in the county of Essex and State of New Jersey, have invented new and useful Improvements in Trucks, of which the following is a specification.

This invention relates to trucks especially adapted to be used for handling baggage, mail sacks and the like and it consists in the novel features hereinafter described and claimed.

An object of the invention is to provide a strong and durable truck consisting of a running gear and a body detachably mounted thereon, the body having a pivotally mounted panel upon which the baggage may rest. The body is also provided with means for holding the panel against pivoted or swinging movement, there being a lever operated mechanism for actuating the said holding means to release the panel whereby the panel may swing after the body has been removed from the truck and thus permit the baggage to deposit in a car.

The truck is especially adapted to be used at railway depots and stations and the baggage or mail sacks may be loaded upon the same in the usual manner. When the time arrives to deposit the baggage or mail in a car, the truck is trunneled or moved to the side of the baggage car and brought to a state of rest opposite the door opening thereof. The car is provided at its door opening with an overhead track disposed transversely of the car and a carriage is mounted for movement along the track. Block and tackle mechanism is attached to the carriage and may be connected with the body of the truck for lifting the same from the running gear and swinging the same into the car through the door opening thereof.

The system of manipulating the bodies of a series of trucks may be such that the body removed from the truck at one station may be retained in the car while the baggage is removed from the same, and when the car arrives at the next station it may be removed from the car after the body at the last mentioned station has been placed in the car. In other words, the body, after it is relieved of its load, may be returned to the same truck or the bodies may be interchangeable and may be shifted from the truck at one station to the truck at another station. By providing the bodies with tiltable panels, the baggage may be readily dumped in the car and consequently but little time is consumed in transferring the baggage from the truck to the car.

Figure 4:
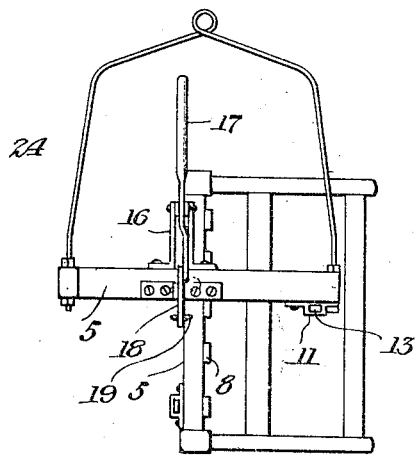
Figure 5:
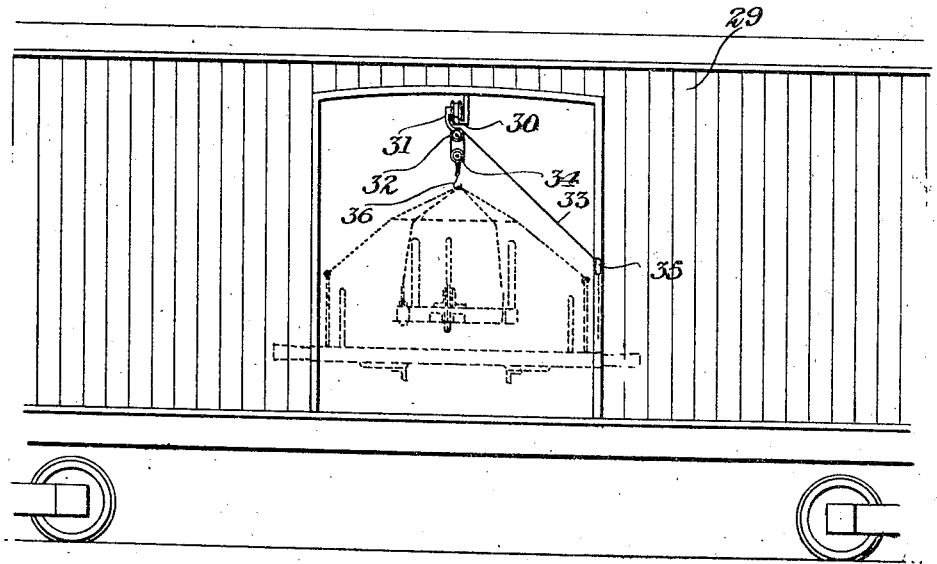

In the accompanying drawings: Figure 1 is a side elevation of the truck. Fig. 2 is a bottom plan view of the body of the truck. Fig. 3 is an end elevation of the body of the truck showing the panel in normal position. Fig. 4 is a similar view showing the panel in its tilted or dumping position with relation to the body. Fig. 5 is a side elevation of a portion of a car illustrating in dotted lines the manner in which the body may be inserted through the door opening.

The truck consists of a running gear which includes a frame 1 supported upon wheels 2 and having a tongue 3 pivotally connected therewith. Stakes 4 are mounted upon the frame 1 and the upper ends of the said stakes are disposed above the upper sides of the supporting wheels 2.

The body of the truck is supported upon a frame 1 between the upper end of the stakes 4 and the said body includes a frame 5, which includes a side rail having handles 6, fashioned at its end and end rails 7 secured to the said rail in the vicinity of the handles 6 thereof. A panel 8 is pivotally mounted upon the end rails 7 of the frame 5 by means of trunnions 9 and stops 10 are mounted upon the side rail of the frame 5 and extend into the path of movement of the panel 8, whereby the swinging movement of the said panel is limited with relation to the frame 5. Keepers 11 are mounted at the under side of the end rails 7 of the frame 5 and bolt casings 12 are mounted at the under side of the panel 8 in the vicinity of the edge thereof. Spring pressed bolts 13 are movably mounted in the casings 12 and the said bolts normally enter the keepers 11 and thus the panel 8 is held in engagement with the stops 10. A rock arm 14 is pivotally mounted at the under side of the panel 8 at a point between the ends thereof and links 15 connect the ends of the said rock arm 14 with the inner ends of the bolts 13. Standards 16 are mounted upon one of the end rails 7 of the frame 5 and a lever 17 is fulcrumed between the said standards. A bell crank lever 18 is fulcrumed upon the same end rail 7 and one end of the said bell crank lever is connected with the lower end of the lever 17. A rod 19 has link connection at one end with the lower end of the bell crank lever 18 and a similar connection at its other end with the inner end of the rock arm 14. The panel 8 is provided at one edge with a rail 20, the ends of which are fashioned into handles 21 and the handles 21 are disposed parallel with the handles 6. Cleats 22 are mounted upon blocks 23 and the said blocks are adapted to rest upon the frame 1 of the running gear of the truck when the body is in position thereon and the cleats 22 bear against the sides of the truck frame 1 as best shown in Fig. 1 of the drawing and prevent the body of the truck from having movement longitudinally with relation to the running gear. Also when the body is in position upon the running gear, the upper ends of the stakes 4 prevent the body from having movement transversely with relation to the running gear.

Bails 24 are mounted at the ends of the body frame 5 and chains 25 are connected with the upper ends of the said bails. The upper ends of the chains 25 are connected with a cross bar 26, best shown in Fig. 1 of the drawing, and chains 27 are also connected with the said cross bar. The inner ends of the chains 27 are connected with a ring 28.

As shown in Fig. 5 of the drawing, the baggage or mail car 29 is provided opposite its door openings with a transversely disposed overhead track 30. A carriage 31 is mounted for movement along the said track and is provided with a pulley 32. One end of a cable 33 is attached to the carriage 32 and from the point of attachment the said cable depends and supports a pulley block 34. From the said block the cable 33 is trained over the pulley 32 and is then carried down and may be secured to a cleat 35 attached to the side of the car. The pulley block 34 carries a hook 36 which may be engaged with the ring 28 at the upper ends of the chains 27.

In operation the pieces of baggage or the sacks of mail are placed upon the upper surface of the panel 8 when the body is in position upon the running gear and the parts are in the positions as shown in Fig. 1 of the drawing. When it is desired to transfer the articles upon the panel 8 to a car the truck is moved to the side of the car and the carriage 31 is moved along the track 30, and the hook 36 is engaged in the ring 28. A pull is then exerted upon the cable 33 whereby the body is lifted from the running gear of the truck and the said body is turned through the door opening of the car 29 in a manner as indicated in Fig. 5 of the drawing. After the body and the articles thereon have been transferred to the interior of the car, they may be deposited upon the floor of the car by paying out the cable 33 and the body may be carried with the baggage in the car to the next station and may then be placed upon the station platform to be applied to another truck. If it is desired to remove the body from the car at the point at which the body is transferred from the truck into the car, an operator grasps the lever 17 before the body is lowered and swings the said lever, whereby the bell crank lever 18 is rocked and the rod 19 is moved longitudinally. This movement on the part of the rod 19 swings the rock arm 14 whereby the links 15 are moved simultaneously in an inward direction and the bolts 13 are withdrawn from the keepers 11.

By reference to Fig. 2 of the drawing, it will be seen that the trunnions 9 are positioned at one side of the median longitudinal dimension of the panel 8. Consequently the center of gravity of the said panel and the articles thereon is at one side of the axis of the trunnion 9. Therefore it will be seen that when the bolts 13 are withdrawn from the keepers 11, the panel 8 may swing from the position shown in Fig. 3 in the drawing to the position shown in Fig. 4, and hence the baggage or sacks which have previously been deposited upon the panel are permitted to dump upon the floor of the car. After this the panel 8 may be swung back to the position shown in Fig. 3 of the drawing and the said body may be passed out of the door opening of the car and placed in position upon the running gear.

From the above description, taken in conjunction with the accompanying drawing, it will be seen that a truck of simple and durable structure is provided and that the same may be easily and conveniently used about railway stations or depots for the purpose of transferring and handling baggage and the like, and inasmuch as the bodies of the trucks are interchangeable with the running gears thereof, considerable time may be saved by receiving a body at one station and depositing it at another and while the car is in transit the articles thereon may be removed from the body and properly packed in the car.

Having thus described the invention what is claimed is:—

A truck body comprising a side rail and end rails fixed thereto, a panel pivoted at its ends to the end rails at points between the ends thereof, said panel having a side rail which corresponds with the side rail of the body and means for locking the panel in the body.

In testimony whereof I, affix my signature in presence of two witnesses.

JULIAN DIOU.

Witnesses:
 MICHAEL PADULA,
 LUCY DIOU.